US012747769B2

(12) United States Patent
Schab et al.

(10) Patent No.: US 12,747,769 B2
(45) Date of Patent: Sep. 29, 2026

(54) CONTROLLED DAMPER WITH PROPORTIONAL VALVE AND CROSS-FLOW BYPASS SLEEVE

(71) Applicant: BeijingWest Industries Co., Ltd., Beijing (CN)

(72) Inventors: Jakub Schab, Cracow (PL); Bartlomiej Franczyk, Cracow (PL)

(73) Assignee: BeijingWest Industries Co., Ltd., Beijing (CN)

( * ) Notice: Subject to any disclaimer, the term of this patent is extended or adjusted under 35 U.S.C. 154(b) by 756 days.

(21) Appl. No.: 18/305,310

(22) Filed: Apr. 21, 2023

(65) Prior Publication Data

US 2023/0400082 A1 Dec. 14, 2023

(30) Foreign Application Priority Data

Jun. 10, 2022 (CN) ........................ 202210651471.3

(51) Int. Cl.
*F16F 9/348* (2006.01)
*F16F 9/06* (2006.01)
*F16F 9/48* (2006.01)

(52) U.S. Cl.
CPC .............. *F16F 9/3481* (2013.01); *F16F 9/06* (2013.01); *F16F 9/48* (2013.01); *F16F 2222/12* (2013.01);
(Continued)

(58) Field of Classification Search
CPC .. F16F 9/3481; F16F 9/06; F16F 9/469; F16F 9/48; F16F 2222/12; F16F 2228/066; F16F 2236/103
See application file for complete search history.

(56) References Cited

U.S. PATENT DOCUMENTS 4,671,392 A 6/1987 Wossner
4,986,393 A 1/1991 Preukschat et al.
(Continued)

FOREIGN PATENT DOCUMENTS

CN 106838100 A 6/2017
CN 113969953 A 1/2022
(Continued)

OTHER PUBLICATIONS

First Office Action and search report issued on Mar. 9, 2024 for counterpart Chinese patent application No. 202210651471.3, along with machine EN translation downloaded from EPO.
(Continued)

*Primary Examiner* — Thomas W Irvin
(74) *Attorney, Agent, or Firm* — Dickinson Wright PLLC

(57) ABSTRACT

A damper assembly comprises a tube defining a fluid compartment; and a piston slidably disposed in the tube and dividing the fluid compartment into a rebound chamber and a compression chamber. The piston defines a cross-flow passage and includes: a first check valve configured to allow fluid flow from the compression chamber into the cross-flow passage while blocking fluid flow in an opposite direction, a second check valve configured to allow fluid flow from the rebound chamber into the cross-flow passage while blocking fluid flow in an opposite direction, and a proportional valve configured to regulate fluid flow between the cross-flow passage and an outlet passage based on an electrical control signal. Fluid flow is directed through the proportional valve in a same direction during each of a compression stroke and a rebound stroke.

14 Claims, 7 Drawing Sheets

(52) U.S. Cl.
CPC ... *F16F 2228/066* (2013.01); *F16F 2236/103* (2013.01)

(56) References Cited

U.S. PATENT DOCUMENTS

| | | | | |
|---|---|---|---|---|
| 5,248,015 | A | 9/1993 | Yoshioka et al. | |
| 5,293,971 | A | 3/1994 | Kanari et al. | |
| 5,501,307 | A | 3/1996 | Lars | |
| 5,810,127 | A | 9/1998 | Schmidt | |
| 6,860,370 | B2 * | 3/2005 | Nakadate | F16F 9/3485 188/282.5 |
| 10,060,497 | B2 | 8/2018 | Murakami et al. | |
| 10,406,881 | B2 | 9/2019 | Lee | |
| 11,118,648 | B2 * | 9/2021 | Yamashita | F16F 9/18 |
| 11,721,464 | B2 * | 8/2023 | Kamakura | F16F 9/19 188/266.2 |
| 12,106,900 | B2 * | 10/2024 | Kobayashi | F16K 31/0675 |
| 12,163,571 | B2 * | 12/2024 | Yamashita | F16F 9/465 |
| 12,214,641 | B2 * | 2/2025 | Franczyk | F16F 9/3214 |
| 12,287,023 | B2 * | 4/2025 | Kobayashi | F16F 9/46 |
| 12,313,144 | B2 * | 5/2025 | Kim | F16F 9/54 |
| 2008/0018035 | A1 | 1/2008 | Porter et al. | |
| 2012/0145496 | A1 | 6/2012 | Goetz et al. | |
| 2014/0116825 | A1 | 5/2014 | Lindeman | |
| 2016/0201753 | A1 | 7/2016 | Nakano | |
| 2017/0058987 | A1 | 3/2017 | Nakano | |
| 2019/0128360 | A1 * | 5/2019 | Sakuta | F16F 9/3481 |
| 2020/0032871 | A1 * | 1/2020 | Yamashita | F16F 9/3221 |
| 2020/0049220 | A1 | 2/2020 | Kim | |
| 2020/0340545 | A1 | 10/2020 | Strickland | |
| 2023/0120334 | A1 * | 4/2023 | Franczyk | F16F 9/512 188/266.2 |

FOREIGN PATENT DOCUMENTS

| | | | |
|---|---|---|---|
| EP | 0616146 | B1 | 6/1996 |
| EP | 3067585 | A1 | 9/2016 |
| EP | 3537002 | B1 | 12/2020 |
| JP | 09177862 | A | 7/1997 |
| JP | 11173366 | A | 7/1997 |
| JP | 2010038348 | A | 2/2010 |
| KR | 19980023179 | U | 7/1998 |
| KR | 20180098726 | A | 9/2018 |
| KR | 101942557 | B1 | 1/2019 |
| WO | 2016206885 | A1 | 12/2016 |

OTHER PUBLICATIONS

Extended European Search Report issued on Nov. 23, 2023 for counterpart European patent application No. 23177177.5.

* cited by examiner

CONTROLLED DAMPER WITH PROPORTIONAL VALVE AND CROSS-FLOW BYPASS SLEEVE

CROSS-REFERENCE TO RELATED APPLICATIONS

This application claims priority to Chinese Patent Application No. 202210651471.3, filed on Jun. 10, 2022, which is hereby incorporated by reference in its entirety.

BACKGROUND OF THE INVENTION

1. Field of the Invention

The present invention relates generally to a damper assembly for a vehicle and, in particular a damper assembly including a proportional control valve.

2. Description of the Prior Art

Suspension systems are provided to filter or isolate the vehicle's body (sprung portion) from the vehicle's wheels and axles (unsprung portion) when the vehicle travels over vertical road surface irregularities as well as to control body and wheel motion. In addition, suspension systems are also used to maintain an average vehicle attitude to promote improved stability of the vehicle during maneuvering. The typical passive suspension system includes a spring and a damping device in parallel with the spring which are located between the sprung portion and the unsprung portion of the vehicle. Damping devices generally include a damper, which may also be called a shock absorber.

A CVRTD (Continuously Variable Real Time Damping) shock absorber contains a proportional solenoid valve that can seamlessly control the damping force in response to a control signal, such as a control current. There are two types of CVRTD shock absorbers present on the market today, CVRTD dampers with an external valve, which may be mounted outside of a tube of the damper, or CVRTD dampers with an internal valve, located within a piston valve assembly (PVA) of the damper. An advantage of external valves is that they are typically one-way valves with a simple design. In contrast, internal valves must operate in two directions (rebound and compression, according to the movement of the piston rod) what leads to very complex designs and technical difficulties.

SUMMARY OF THE INVENTION

The present invention provides a damper assembly. The damper assembly comprises: a tube defining a fluid compartment; and a piston slidably disposed in the tube and dividing the fluid compartment into a rebound chamber and a compression chamber. The piston defines a cross-flow passage and includes: a first check valve configured to allow fluid flow from the compression chamber into the cross-flow passage while blocking fluid flow in an opposite direction, a second check valve configured to allow fluid flow from the rebound chamber into the cross-flow while blocking fluid flow in an opposite direction, and a proportional valve configured to regulate fluid flow between the cross-flow passage and an outlet passage based on an electrical control signal.

The present disclosure also provides a damper assembly. The damper assembly comprises: a tube defining a fluid compartment; and a piston slidably disposed in the tube and dividing the fluid compartment into a rebound chamber and a compression chamber, the piston defines a cross-flow passage and includes a housing having a tubular shape containing a proportional valve configured to regulate fluid flow between the cross-flow passage and an outlet passage based on an electrical control signal, wherein fluid flow is directed through the proportional valve in a same direction during each of a compression stroke and a rebound stroke. The housing of the piston defines a rebound flow passage therethrough providing fluid communication between the rebound chamber an interior space of the housing to allow fluid flow therethrough during each of a compression stroke and a rebound stroke.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENTS

Referring to the Figures, wherein like numerals indicate corresponding parts throughout the several views, it is one aspect of the present invention to provide a damper assembly 20, which may be used as a part of a suspension in a vehicle, such as a passenger car or truck. The damper assembly 20 of the present disclosure is shown as a mono-tube damper. However, the principles of the present disclosure may be used with other types of dampers, such as in a twin-tube damper.

The damper assembly 20 of the present disclosure provides a unique solution for the implementation of a one-way continuously variable real-time damping (CVRTD) solenoid valve within a piston valve assembly.

Figure 1:
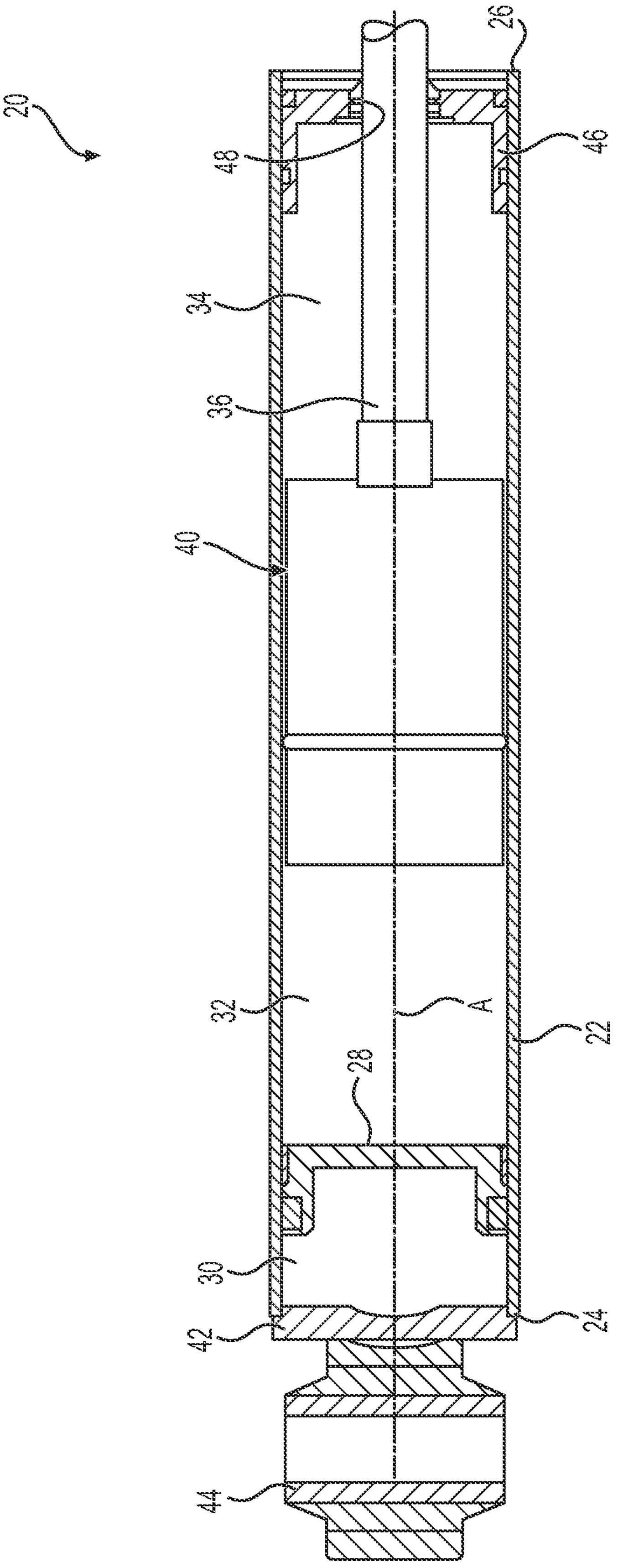
FIG. 1 is a cutaway view of a damper assembly in accordance with one embodiment of the present invention.

As generally shown in FIG. 1, the damper assembly 20 includes a damper tube 22 having a tubular shape extending along a center axis A between a first end 24 and a second end 26 and defining a main compartment 30, 32, 34 therein. The damper assembly 20 also includes a gas cup 28 disposed in the main compartment 30, 32, 34 in sealing engagement with the damper tube 22 and slidable along the center axis A to divide the main compartment 30, 32, 34 into a gas compartment 30 for containing a gas and a fluid compartment 32, 34. The gas compartment 30 extends between the first end 24 and the gas cup 28, and the fluid compartment 32, 34 extends between the gas cup 28 and the second end 26.

The damper assembly 20 also includes a damper rod 36 that extends along the center axis A. The damper rod 36 includes a rod end located inside of the fluid compartment 32, 34. A piston 40 is attached to the damper rod 36 adjacent to the rod end, and configured to move with the damper rod 36 along the center axis A through the damper tube 22. The piston 40 divides the fluid compartment 32, 34 into a compression chamber 32 and a rebound chamber 34. The compression chamber 32 extends between the piston 40 and the gas cup 28, and the rebound chamber 34 extends between the second end 26 and the piston 40.

A first closure 42 seals the gas compartment 30 at the first end 24 of the damper tube 22. A damper mount 44 is attached to the first closure 42 and configured to attach the damper assembly 20 to a body of a vehicle (not shown). The damper assembly 20 of the present disclosure may be used in other configurations and/or orientations. For example, the damper mount 44 may connect the damper tube 22 of the damper assembly 20 to a chassis component of a vehicle.

The damper assembly 20 also includes a second closure 46 disposed adjacent to the second end 26 of the damper tube 22 to enclose the rebound chamber 34. The second closure 46 defines a bore 48 for the damper rod 36 to pass through. The second closure 46 may provide a fluid-tight seal with the damper rod 36 to prevent fluid from leaking out of the rebound chamber 34.

Figure 2:
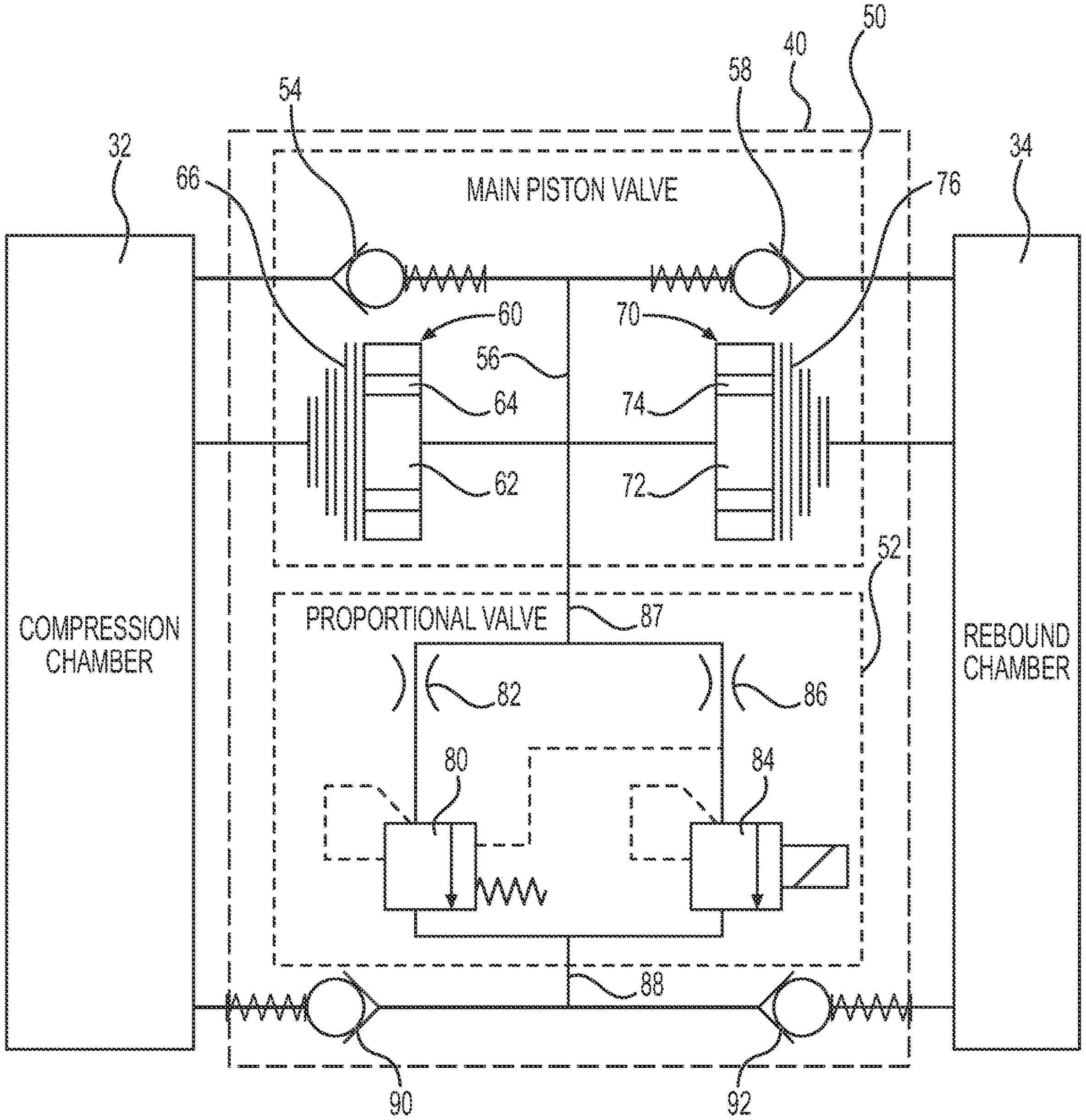
FIG. 2 is a schematic diagram showing fluid flow paths and flow regulating devices within a piston separating a compression chamber from a rebound chamber of the damper assembly.

FIG. 2 shows fluid flow paths and flow regulating devices within the piston 40 separating the compression chamber 32 from the rebound chamber 34. As shown in FIG. 2, the piston 40 includes main piston valve 50 and a proportional valve 52. The main piston valve 50 includes a first check valve 54 configured to allow fluid flow from the compression chamber 32 into a cross-flow passage 56 while blocking fluid flow in an opposite direction. The cross-flow passage 56 may also be called a mutual pressure chamber, because fluid is directed therethrough in each of compression and rebound directions. The main piston valve 50 also includes a second check valve 58 configured to allow fluid flow from the rebound chamber 34 into the cross-flow passage 56 while blocking fluid flow in an opposite direction.

The main piston valve 50 also includes a rebound valve assembly 60 configured to regulate fluid flow from the cross-flow passage 56 into the compression chamber 32 during a rebound stroke. The rebound valve assembly 60 includes a rebound valve member 62 that defines one or more rebound valve passages 64 and one or more rebound valve discs 66 that cover the rebound valve passages 64. The one or more rebound valve discs 66 are configured to deflect away from the rebound valve passages 64 to provide a restriction to fluid flow therethrough.

The main piston valve 50 also includes a compression valve assembly 70 configured to regulate fluid flow from the cross-flow passage 56 into the rebound chamber 34 during a compression stroke. The compression valve assembly 70 includes a compression valve member 72 that defines one or more compression valve passages 74 and one or more compression valve discs 76 that cover the compression valve passages 74. The one or more compression valve discs 76 are configured to deflect away from the compression valve passages 74 to provide a restriction to fluid flow therethrough.

The proportional valve 52 includes an inlet passage 87 and an outlet passage 88. The inlet passage 87 is in fluid communication with the cross-flow passage 56 for receiving fluid therefrom during either of the compression stroke or the rebound stroke. The proportional valve 52 includes a first valve 80 and a solenoid valve 84 in a parallel arrangement, each configured to regulate fluid flow between the inlet passage 87 and the outlet passage 88. The first valve 80 may be activated by fluid pressure and spring force. FIG. 2 shows a first orifice 82 in the flow path between the inlet passage 87 and the first valve 80 and a second orifice 86 in the flow path between the inlet passage 87 and the solenoid valve 84. However, either or both of the orifices 82, 86 may represent flow restricting characteristics of the corresponding valve 80, 84.

As shown in FIG. 2, the piston 40 also includes a third check valve 90 configured to allow fluid flow from the outlet passage 88 to the compression chamber 32 while blocking fluid flow in an opposite direction. The piston 40 also includes a fourth check valve 92 configured to allow fluid flow from the outlet passage 88 to the rebound chamber 34 while blocking fluid flow in an opposite direction.

Figure 3A:
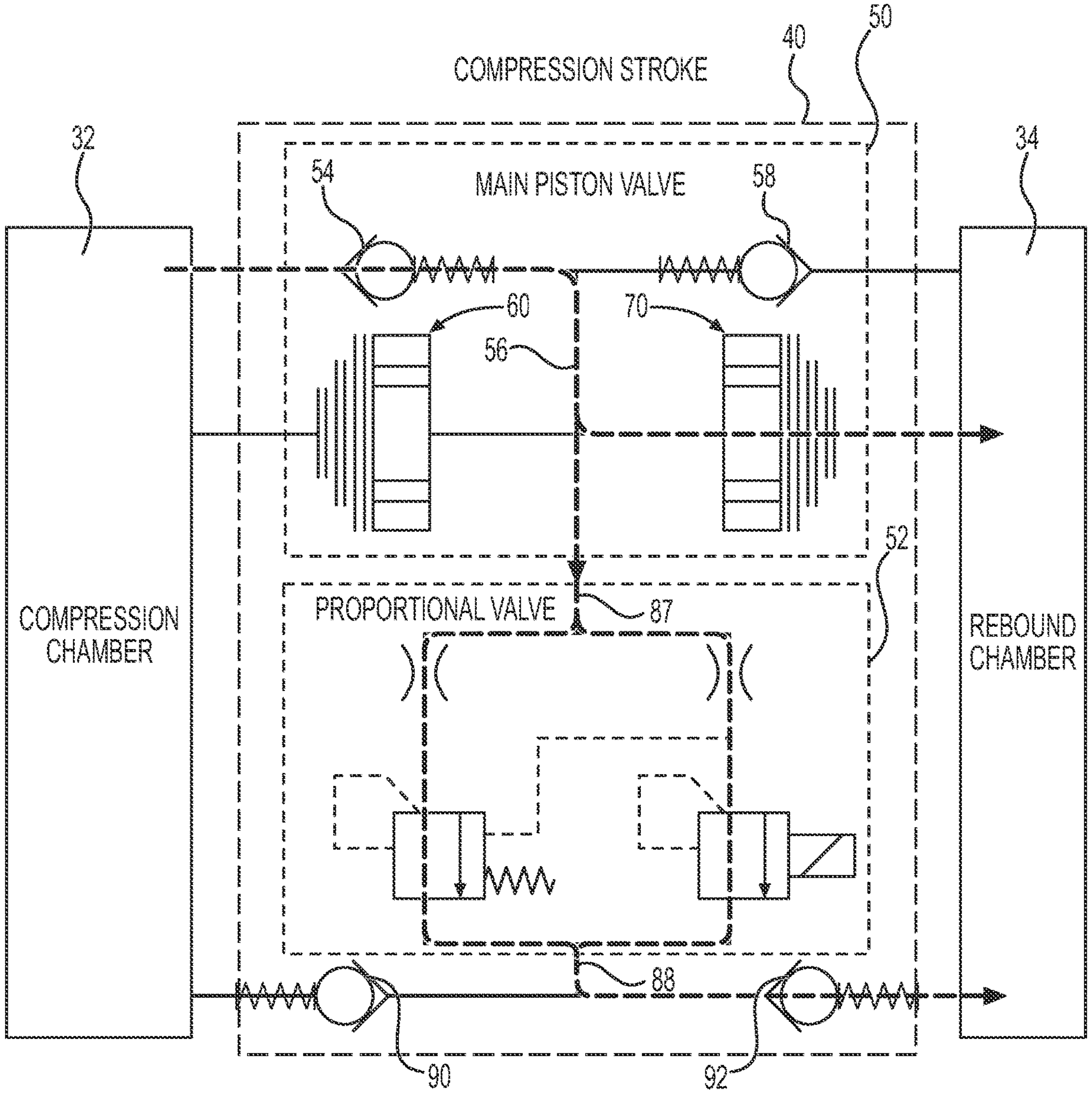
FIG. 3A shows the schematic diagram of FIG. 2, illustrating fluid flow therethrough during a compression stroke of the damper assembly.

FIG. 3A shows the schematic diagram of FIG. 2, illustrating fluid flow through the piston 40 during a compression stroke of the damper assembly 20. As shown in FIG. 3A, fluid flows from the compression chamber 32 through each of the main piston valve 50 and the proportional valve 52 and into the rebound chamber 34. Fluid flows from the compression chamber 32 through the first check valve 54 and into the cross-flow passage 56. The fluid then flows from the cross-flow passage 56 through either or both of the compression valve assembly 70 and/or the proportional valve 52 and to the rebound chamber 34. The compression valve assembly 70 and the proportional valve 52 are arranged in a parallel configuration. Thus, the proportional valve 52 may function to reduce a damping characteristic of the piston 40 during the compression stroke by directing some amount of fluid from the cross-flow passage 56 directly to the rebound chamber 34, bypassing the compression valve assembly 70.

Figure 3B:
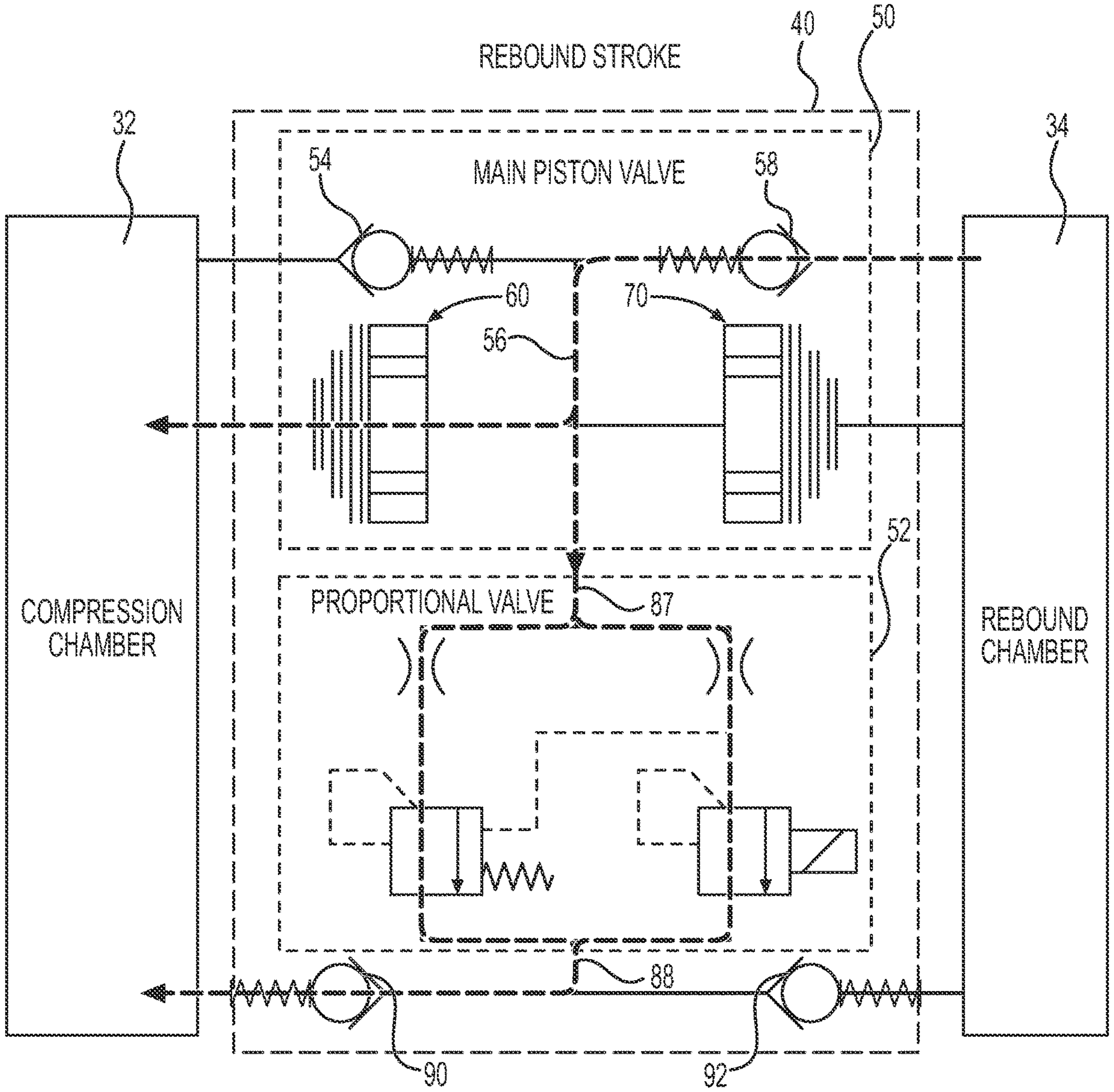
FIG. 3B shows the schematic diagram of FIG. 2, illustrating fluid flow therethrough during a rebound stroke of the damper assembly.

FIG. 3B shows the schematic diagram of FIG. 2, illustrating fluid flow through the piston 40 during a rebound stroke of the damper assembly 20. As shown in FIG. 3B, fluid flows from the rebound chamber 34 through each of the main piston valve 50 and the proportional valve 52 and into the compression chamber 32. More specifically, fluid flows through the second check valve 58 and into the cross-flow passage 56. The fluid then flows from the cross-flow passage 56 through either or both of the rebound valve assembly 60 and/or the proportional valve 52 and to the compression chamber 32. The rebound valve assembly 60 and the proportional valve 52 are arranged in a parallel configuration. Thus, the proportional valve 52 may function to reduce a damping characteristic of the piston 40 during the rebound stroke by directing some amount of fluid from the cross-flow passage 56 directly to the compression chamber 32, bypassing the rebound valve assembly 60.

Figure 4:
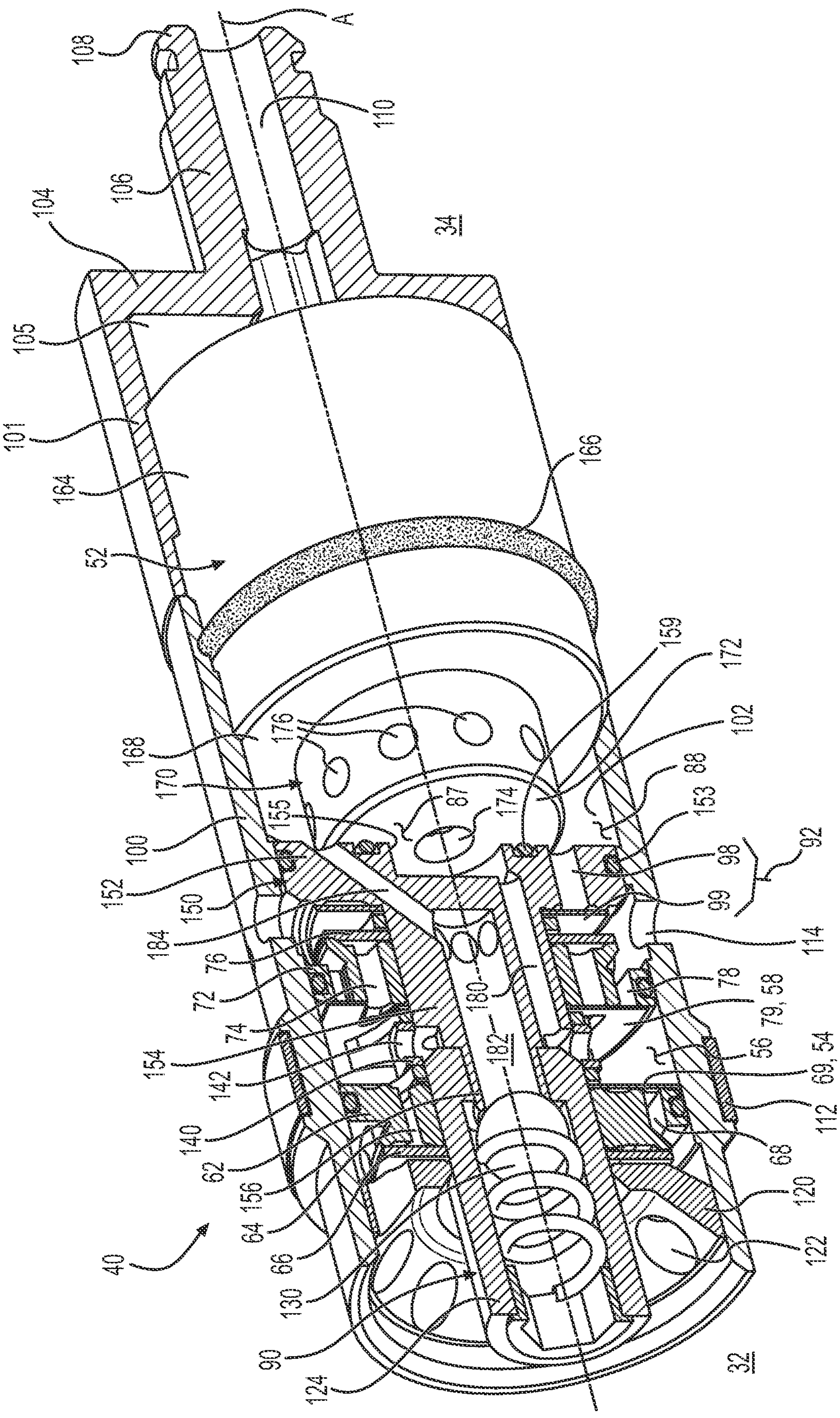
FIG. 4 shows a partial cut-away perspective view of the piston in accordance with an embodiment of the present invention.

FIG. 4 shows a partial cut-away perspective view of the piston 40. The piston 40 includes a housing 100, 101 including a first housing member 100 having a tubular shape and a second housing member 101 having a wineglass shape with a tubular portion coaxial with the first housing member 100 having similar or identical dimensions thereto and abutting thereagainst. Each of the housing members 100, 101 defines an interior space 102 for receiving various components of the piston 40. The housing members 100, 101 may be joined using a threaded connection, by welding, using an adhesive, one or more fasteners or with any other suitable fixing means. Alternatively, the housing 100, 101 may have a unitary (i.e. monolithic) construction.

The second housing member 101 includes an end wall 104 defining a lower surface 105 facing toward the compression chamber 32 with the piston 40 installed within the damper tube 22 of the damper assembly 20. The second housing member 101 also includes a tubular extension 106 having a tubular shape and extending in a direction opposite of the lower surface 105. The tubular extension 106 includes a connection feature 108 for engaging the damper rod 36 to secure the piston 40 therewith. The tubular extension 106 also defines a central bore 110 for passage of electrical wires therethrough for providing power and/or control signals to the proportional valve 52. The electrical wires may pass through the damper rod 36 and may be sealed against fluid intrusion. The piston 40 also includes an annular band 112 of resilient material, such as Teflon, disposed around an outer surface of the housing 100, 101 to form a seal against an interior surface of the damper tube 22, thereby blocking fluid from leaking around the piston 40 between the compression chamber 32 and the rebound chamber 34.

Figure 5:
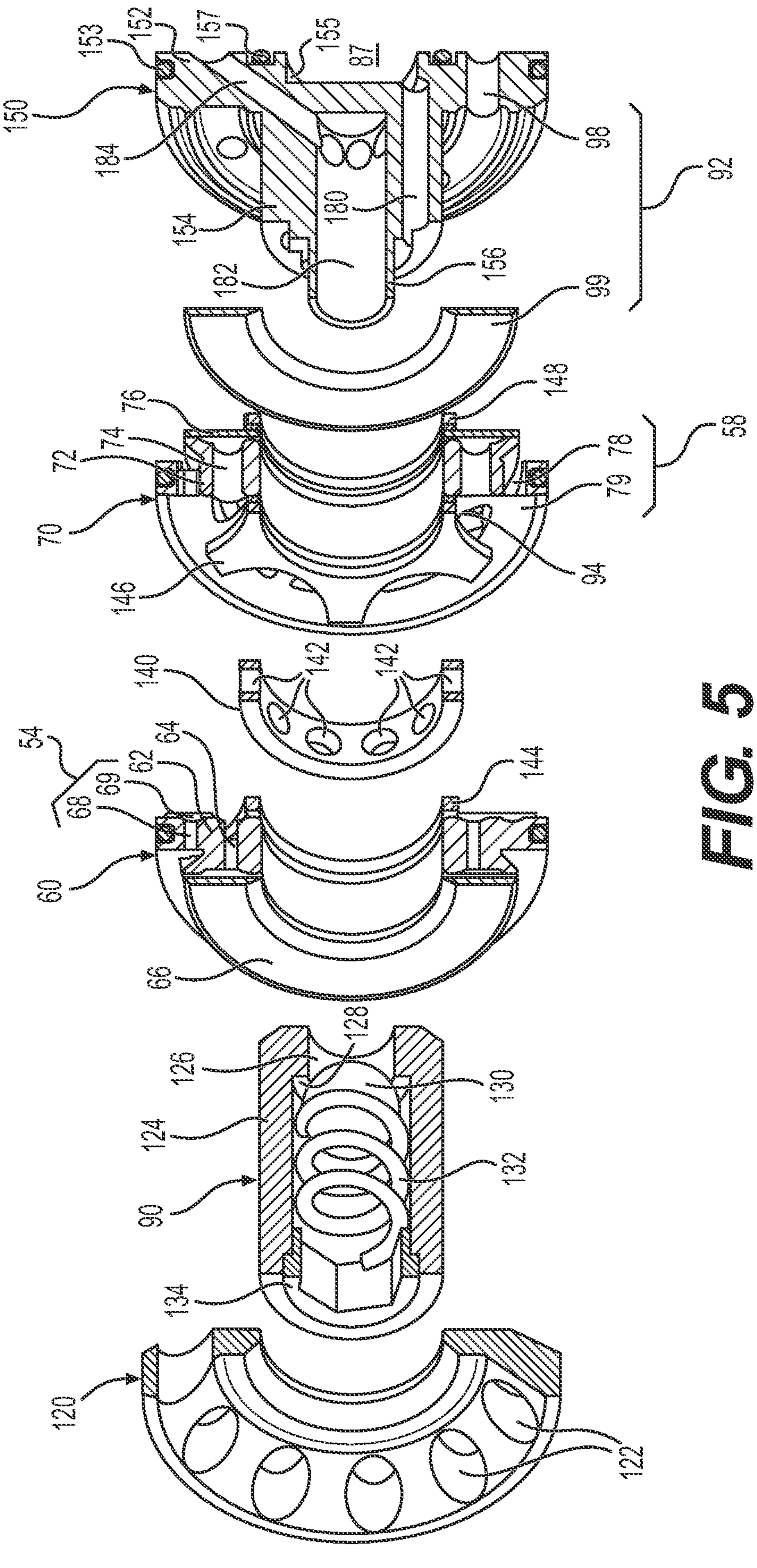
FIG. 5 shows a partial cut-away perspective view of components within the piston of FIG. 4.

As shown in FIG. 4, the piston 40 includes an end cap 120 having a ring shape, with a plurality of end holes 122 extending therethrough. The end cap 120 is configured to fit within the interior space 102 of the housing 100, 101 adjacent to and end thereof in fluid communication with the compression chamber 32 and tightly against an interior surface of the first housing member 100. The piston 40 also includes a check valve body 124 having a tubular shape that extends through a central bore of the end cap 120 and containing components of the third check valve 90, which is configured to allow fluid flow into the compression chamber 32 while blocking fluid flow in an opposite direction As best shown in FIG. 5, a plug 134 is disposed in an outer end of the central bore of the check valve body 124 for retaining the components of the third check valve 90 therein. The plug 134 may be threaded therein, although the plug 134 may be secured with a press fit, by welding, or by another fastening means. The plug 134 may be hollow to transmit fluid from the third check valve 90 into the compression chamber 32. The check valve body 124 includes a narrowed portion 126 defining an annular shoulder 128 facing toward the plug 134 for retaining a valve ball 130 within the check valve body 124. A valve spring 132, formed as a coil spring, is disposed within the check valve body 124 and configured to bias the valve ball 130 away from the plug 134 and into a sealing position.

Referring back to FIG. 4, the piston 40 also includes the rebound valve member 62 having a ring shape disposed annularly around the check valve body 124 and located within the within the interior space 102 of the housing 100, 101 between the end cap 120 and the end wall 104. The rebound valve member 62 defines a peripheral trough extending around a peripheral edge thereof and containing an O-ring seal of resilaiant material, such as rubber, for sealing against the interior surface of the first housing member 100. The rebound valve member 62 defines the rebound valve passages 64 extending therethrough in a direction parallel to and spaced apart from the check valve body 124.

The piston 40 also includes a crossflow bypass member 150 having a flange portion 152 and located within the within the interior space 102 of the housing 100, 101 between the compression valve member 72 and the proportional valve 52. The flange portion 152 defines a peripheral rim holding a first valve seal 153 of resilient material, such as rubber, for sealing against the interior surface of the first housing member 100. The crossflow bypass member 150 also includes a first tubular portion 154 that extends from the flange portion 152 within the interior space 102 of the housing 100, 101 and away from the proportional valve 52. The crossflow bypass member 150 also includes a second tubular portion 156 that extends in an axial direction from the first tubular portion 154 further away from the proportional valve 52. The second tubular portion 156 has a narrower outside diameter than the first tubular member 154. The second tubular portion 156 engages and extends into the check valve body 124. The flange portion 152 of the crossflow bypass member 150 defines a central recess 155 located on the center axis A and facing toward the end wall 104.

The piston 40 also includes the compression valve member 72 having a ring shape disposed annularly around the first tubular portion 154 of the crossflow bypass member 150 and located within the interior space 102 of the housing 100, 101 between the rebound valve member 62 and the flange portion 152 of the crossflow bypass member 150. The compression valve member 72 defines a peripheral trough extending around a peripheral edge thereof and containing an O-ring seal of resilaiant material, such as rubber, for sealing against the interior surface of the first housing member 100. The compression valve member 72 defines the compression valve passages 74 extending therethrough in a direction parallel to and spaced apart from the first tubular portion 154 of the crossflow bypass member 150.

The first housing member 100 defines a plurality of rebound flow passages 114 therethrough and located between the compression valve member 72 and the flange portion 152 of the crossflow bypass member 150 for providing fluid communication between the rebound chamber 34 and a space within the interior space 102 of the housing 100, 101 between the flange portion 152 of the crossflow bypass member 150 and the compression valve member 72. The plurality of rebound flow passages 114 thereby allow fluid flow from the rebound chamber 34 into the cross-flow passage 56 via the second check valve 58 during the rebound stroke. The plurality of rebound flow passages 114 thereby allow fluid flow from the outlet passage 88 to the rebound chamber 34 via the fourth check valve 92 during the compression stroke.

The piston 40 also includes a cross-flow ring 140 having an annular shape disposed around the first tubular portion 154 of the crossflow bypass member 150 between the rebound valve member 62 and the compression valve member 72 and within the interior space 102 of the housing 100, 101 coaxial with and spaced apart from the interior surface thereof. The cross-flow ring 140 defines a plurality of radial bores 142 extending radially therethrough at regular angular intervals. The piston 40 defines the cross-flow passage 56 extending annularly around the cross-flow ring 140 and bounded by the first housing member 100.

The piston 40 also includes the proportional valve 52 disposed within the interior space 102 of the housing 100, 101 between the flange portion 152 of the crossflow bypass member 150 and the end wall 104. The proportional valve 52 includes a body portion 164 having a cylindrical shape and containing a solenoid valve coil (not shown in the FIGs) for controlling fluid flow through the proportional valve 52 in response to application of an electrical signal. The proportional valve 52 also includes a sealing ring 166 of resilient material, such as rubber disposed around the body portion 164 and configured to provide a liquid-tight seal against an inner surface of the first housing member 100 for preventing liquid from migrating toward the lower surface 105 of the end wall 104, where the liquid could escape via the central bore 110 of the tubular extension 106. The body portion 164 of the proportional valve 52 also defines a distal surface 168 facing away from the end wall 104, and which is spaced apart from and parallel to the flange portion 152 of the crossflow bypass member 150.

The proportional valve 52 also includes a valve chassis 170 having a cylindrical shape extending from the distal surface 168 of the body portion 164. The valve chassis 170 has a smaller diameter than the body portion 164 and is coaxial therewith. The valve chassis 170 defines an end surface 172 facing away from the end wall 104, with an intake hole 174 in the center thereof for receiving fluid from the inlet passage 87 into the valve chassis 170. The valve chassis 170 also defines a plurality of discharge holes 176 disposed at regular angular intervals in a cylindrical side wall thereof for conveying fluid from the proportional valve 52 and into the outlet passage 88.

The inlet passage 87 is defined within the central recess 155 of the crossflow bypass member 150 and between the central recess 155 and the end surface 172 of the valve chassis 170. The outlet passage 88 is defined within the interior space 102 of the housing 100, 101, between the flange portion 152 of the crossflow bypass member 150 and the distal surface 168 of the body portion 164 and annularly around the valve chassis 170. The flange portion 152 of the crossflow bypass member 150 defines an annular recess facing toward the end wall 104 and holding a second valve seal 157 of resilient material, such as rubber, for sealing against the end surface 172 of the valve chassis 170 to prevent fluid from leaking between the inlet passage 87 and the outlet passage 88.

As shown in FIG. 5, the rebound valve member 62 also defines one or more first one-way passages 68 providing fluid communication therethrough from the compression chamber 32, via the end holes 122 in the end cap 120, and to the cross-flow passage 56. The rebound valve assembly 60 also includes a first one-way disc 69 covering the first one-way passages 68 and configured to deflect away from the rebound valve member 62 to allow fluid flow therethrough from the compression chamber 32, and to the cross-flow passage 56, while blocking fluid flow in an opposite direction. Together, the first one-way passages 68 and the first one-way disc 69 comprise the first check valve 54.

A first disc retainer 144 has a star shape and is disposed between the rebound valve member 62 and the cross-flow ring 140. The first disc retainer 144 functions to limit a deflection of the first one-way disc 69. A spacer ring (not labeled) is disposed between the first disc retainer 144 and the first one-way disc 69 and holds the first one-way disc 69 to the rebound valve member 62 while leaving at least a portion of the first one-way disc 69 free to deflect away from the first one-way passages 68.

The compression valve member 72 also defines one or more second one-way passages 78 providing fluid communication therethrough from the rebound chamber 34, via the rebound flow passages 114, and to the cross-flow passage 56. The compression valve assembly 70 also includes a second one-way disc 79 covering the second one-way passages 78 and configured to deflect away from the compression valve member 72 to allow fluid flow therethrough from the rebound chamber 34, and to the cross-flow passage 56, while blocking fluid flow in an opposite direction. Together, the second one-way passages 78 and the second one-way disc 79 comprise the second check valve 58.

A second disc retainer 146 has a star shape and is disposed between the cross-flow ring 140 and the compression valve member 72. The second disc retainer 146 functions to limit a deflection of the second one-way disc 79. A spacer ring (not labeled) is disposed between the second disc retainer 146 and the second one-way disc 79 and holds the second one-way disc 79 to the compression valve member 72 while leaving at least a portion of the second one-way disc 79 free to deflect away from the second one-way passages 78.

The flange portion 152 of the crossflow bypass member 150 also defines one or more third one-way passages 98 providing fluid communication therethrough from the outlet passage 88 and to the rebound chamber 34, via the rebound flow passages 114. The crossflow bypass member 150 also includes a third one-way disc 99 covering the third one-way passages 98 and configured to deflect away from the flange portion 152 to allow fluid flow therethrough from the outlet passage 88 and to the rebound chamber 34, while blocking fluid flow in an opposite direction. Together, the third one-way passage 98 and the third one-way disc 99 comprise the fourth check valve 92.

A third disc retainer 148 has a star shape and is disposed between the compression valve discs 76 and the third one-way disc 99. The third disc retainer 148 functions to limit a deflection of the third one-way disc 99. A spacer ring (not labeled) is disposed between the third disc retainer 148 and the third one-way disc 99 and holds the third one-way disc 99 to the flange portion 152 of the crossflow bypass member 150 while leaving at least a portion of the third one-way disc 99 free to deflect away from the third one-way passages 98.

As best shown in FIG. 4, the crossflow bypass member 150 defines a plurality of first crossflow bypass passages 180 that each provide fluid communication between the cross-flow passage 56 and the inlet passage 87 for supplying fluid to the proportional valve. FIG. 4 shows one of the first crossflow bypass passages 180, which extends in an axial direction and is radially spaced apart from the center axis A to provide the fluid communication into the cross-flow passage 56 via a center of the cross-flow ring 140. The crossflow bypass member 150 also defines a second cross-flow bypass passage 182 through a center of the first tubular portion 154 and a center of the second tubular portion 156, along the center axis A. The second crossflow bypass passage 182 may be formed as a blind hole with an opening on the end of the second tubular portion 156 that is selectively covered by the valve ball 130 of the third check valve 90. The crossflow bypass member 150 also defines a plurality of one or more third crossflow bypass passages 184 that extend generally radially and axially through the flange portion 152 of the crossflow bypass member 150 to provide fluid communication between the outlet passage 88 and the second crossflow bypass passage 182. Together, the second crossflow bypass passage 182 and the third crossflow bypass passages 184 provide fluid communication between the outlet passage 88 and the compression chamber 32 via the third check valve 90.

Figure 6:
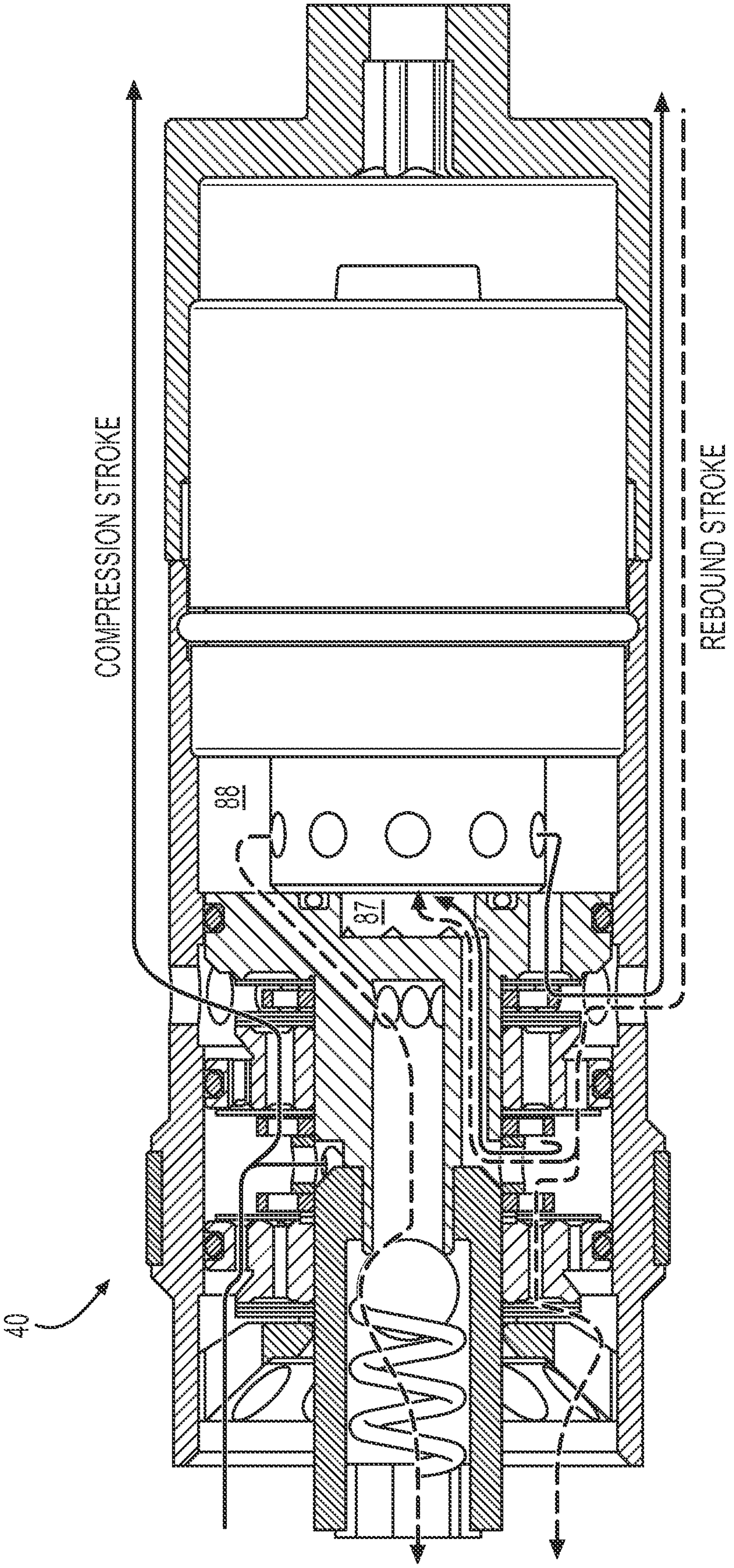
FIG. 6 is a cutaway side view of the piston of FIG. 4, and showing flow therethrough in each of a compression stroke and in a rebound stroke.

FIG. 5 shows a partial cut-away perspective view of components within the piston 40 of FIG. 4. FIG. 6 is a cutaway side view of the piston of FIG. 4, and showing flow therethrough in each of a compression stroke and in a rebound stroke.

Obviously, many modifications and variations of the present invention are possible in light of the above teachings and may be practiced otherwise than as specifically described while within the scope of the appended claims. The use of the word "said" in the apparatus claims refers to an antecedent that is a positive recitation meant to be included in the coverage of the claims whereas the word "the" precedes a word not meant to be included in the coverage of the claims.

What is claimed is:

1. A damper assembly comprising:

a tube defining a fluid compartment; and a piston slidably disposed in the tube and dividing the fluid compartment into a rebound chamber and a compression chamber, the piston defines a cross-flow passage and includes:

a first check valve configured to allow fluid flow from the compression chamber into the cross-flow passage while blocking fluid flow in an opposite direction, a second check valve configured to allow fluid flow from the rebound chamber into the cross-flow passage while blocking fluid flow in an opposite direction, and a proportional valve configured to regulate fluid flow between the cross-flow passage and an outlet passage based on an electrical control signal, wherein the piston further comprises: a rebound valve assembly configured to regulate fluid flow from the cross-flow passage into the compression chamber during a rebound stroke; a compression valve assembly configured to regulate fluid flow from the cross-flow passage into the rebound chamber during a compression stroke; and a housing having a tubular shape defining an interior space containing said rebound valve assembly, said compression valve assembly, and said proportional valve, wherein the damper assembly further comprises: a cross-flow bypass member including a flange portion located within the interior space of the housing between the compression valve assembly and the proportional valve, and a tubular portion extending from the flange portion away from the proportional valve and through at least one of the rebound valve assembly and the compression valve assembly, wherein the damper assembly further comprises:

an end cap having a ring shape configured to fit within the interior space of the housing adjacent to an end thereof in fluid communication with the compression chamber; and a check valve body having a tubular shape extending through a central bore of the end cap and containing a check valve allowing fluid flow into the compression chamber while blocking fluid flow in an opposite direction; and wherein the crossflow bypass member further includes a second tubular portion extending from the tubular portion further away from the proportional valve and into the check valve body.

2. The damper assembly of claim 1, wherein fluid flow is directed through the proportional valve in a same direction during each of a compression stroke and a rebound stroke.

3. The damper assembly of claim 1, wherein the piston further includes:

a third check valve configured to allow fluid flow from the outlet passage to the compression chamber while blocking fluid flow in an opposite direction, and a fourth check valve configured to allow fluid flow from the outlet passage to the rebound chamber while blocking fluid flow in an opposite direction.

4. The damper assembly of claim 1, wherein the rebound valve assembly includes a rebound valve member defining a rebound valve passage, and a rebound valve disc covering the rebound valve passage and configured to deflect away therefrom to restrict fluid flow therethrough.

5. The damper assembly of claim 4, wherein the rebound valve assembly further comprises said first check valve including said rebound valve member defining a first one-way passage extending therethrough, and a first one-way disc covering the first one-way passage and configured to deflect away therefrom to allow fluid flow therethrough in one direction while blocking fluid flow in an opposite direction.

6. The damper assembly of claim 1, wherein the compression valve assembly includes a compression valve member defining a compression valve passage, and a compression valve disc covering the compression valve passage and configured to deflect away therefrom to restrict fluid flow therethrough.

7. The damper assembly of claim 6, wherein the compression valve assembly further comprises said second check valve including said compression valve member defining a second one-way passage extending therethrough, and a second one-way disc covering the second one-way passage and configured to deflect away therefrom to allow fluid flow therethrough in one direction while blocking fluid flow in an opposite direction.

8. The damper assembly of claim 1, wherein the piston further includes the cross-flow passage extending between said rebound valve assembly and said compression valve assembly.

9. The damper assembly of claim 1, wherein the piston further includes a cross-flow ring having an annular shape disposed between the rebound valve assembly and the compression valve assembly and within an interior space of the housing coaxial with and spaced apart from an interior surface thereof, with the cross-flow passage extending annularly around the cross-flow ring.

10. The damper assembly of claim 1, wherein the cross-flow bypass member defines a first crossflow bypass passage providing fluid communication between the cross-flow passage and an inlet passage for supplying fluid from the cross-flow passage to the proportional valve.

11. The damper assembly of claim 1, wherein the cross-flow bypass member defines a second crossflow bypass passage providing fluid communication between an outlet passage and the compression chamber for transmitting fluid from the proportional valve to the compression chamber.

12. The damper assembly of claim 1, wherein the flange portion of the crossflow bypass member defines a third one-way passage extending therethrough and providing fluid communication between an outlet passage and the rebound chamber for transmitting fluid from the proportional valve to the rebound chamber, and wherein the crossflow bypass member further includes a third one-way disc covering the third one-way passage and configured to deflect away therefrom to allow fluid flow therethrough in one direction while blocking fluid flow in an opposite direction.

13. The damper assembly of claim 1, wherein the tube of the damper assembly further defines a gas compartment containing a gas, and wherein the damper assembly further includes a gas cup disposed in the tube in sealing engagement therewith and slidable along a center axis A thereof to divide the fluid compartment from the gas compartment.

14. A damper assembly comprising:

a tube defining a fluid compartment; and a piston slidably disposed in the tube and dividing the fluid compartment into a rebound chamber and a compression chamber, the piston defines a cross-flow passage and includes a housing having a tubular shape containing a proportional valve configured to regulate fluid flow between the cross-flow passage and an outlet passage based on an electrical control signal, wherein fluid flow is directed through the proportional valve in a same direction during each of a compression stroke and a rebound stroke, wherein the housing of the piston defines a rebound flow passage therethrough providing fluid communication between the rebound chamber and an interior space of the housing to allow fluid flow therethrough during each of a compression stroke and a rebound stroke, wherein the piston further includes: a rebound valve assembly configured to regulate fluid flow from the cross-flow passage into the compression chamber during a rebound stroke; and a compression valve assembly configured to regulate fluid flow from the cross-flow passage into the rebound chamber during a compression stroke, wherein the housing further contains said rebound valve assembly, and said compression valve assembly, wherein the damper assembly further comprises: a cross-flow bypass member including a flange portion located within the interior space of the housing between the compression valve assembly and the proportional valve, and a tubular portion extending from the flange portion away from the proportional valve and through at least one of the rebound valve assembly and the compression valve assembly, wherein the damper assembly further comprises:

an end cap having a ring shape configured to fit within the interior space of the housing adjacent to an end thereof in fluid communication with the compression chamber; and a check valve body having a tubular shape extending through a central bore of the end cap and containing a check valve allowing fluid flow into the compression chamber while blocking fluid flow in an opposite direction; and wherein the crossflow bypass member further includes a second tubular portion extending from the tubular portion further away from the proportional valve and into the check valve body.

* * * * *